US006603074B2

United States Patent
Seo

(10) Patent No.: US 6,603,074 B2
(45) Date of Patent: Aug. 5, 2003

(54) STRUCTURE FOR PROTECTING A WIRE HARNESS IN A CORRUGATED TUBE

(75) Inventor: Hiroyuki Seo, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 10/153,704

(22) Filed: May 24, 2002

(65) Prior Publication Data

US 2002/0179318 A1 Dec. 5, 2002

(30) Foreign Application Priority Data

May 29, 2001 (JP) ........................................ 2001-159983

(51) Int. Cl.⁷ ................................................ H02G 3/04
(52) U.S. Cl. .............. 174/71 R; 174/72 A; 174/102 D; 174/135; 174/136
(58) Field of Search ............................. 174/71 R, 72 R, 174/72 A, 102 D, 167, 135, 136; 138/121, 128

(56) References Cited

U.S. PATENT DOCUMENTS

| 3,711,633 A | * | 1/1973 | Ghirardi et al. | .......... 174/71 R |
| 4,384,167 A | * | 5/1983 | Nestor | ....................... 174/71 R |
| 4,797,512 A | * | 1/1989 | Kumagai et al. | ......... 174/71 R |
| 5,352,855 A | * | 10/1994 | Potter | ....................... 174/71 R |
| 5,367,126 A | * | 11/1994 | Kikuchi | .................... 174/71 R |
| 6,078,009 A | * | 6/2000 | Kawamura | .................. 138/162 |
| 6,323,425 B1 | * | 11/2001 | Hegler et al. | .......... 174/102 D |

FOREIGN PATENT DOCUMENTS

| JP | 10-846111 | 3/1998 |
| JP | 2000166054 | 6/2000 |

OTHER PUBLICATIONS

English Language Abstract of JP 2000–166054.
English Language Abstract of JP 10–84611.

* cited by examiner

*Primary Examiner*—Dean A. Reichard
*Assistant Examiner*—Adolfo Nino
(74) *Attorney, Agent, or Firm*—Greenblum & Bernstein, P.L.C.

(57) ABSTRACT

At a position where a branch line is branched from a trunk line of a wire harness in a corrugated tube, side portions located on opposite sides of a slit along the length of the corrugated tube are bent outwardly so as to make a hole surrounding the slit. The branch line extends outwardly from the hole, and the edges of the outwardly bent portion are arranged out of contact with the electric wires of the branch line.

8 Claims, 4 Drawing Sheets

STRUCTURE FOR PROTECTING A WIRE HARNESS IN A CORRUGATED TUBE

BACKGROUND OF THE INVENTION

1. Field of the Invention

The present invention relates to a structure for protecting a wire harness in a corrugated tube, and more particularly, relates to a structure which obviates the need for a divided corrugated tube or a proprietary corrugated tube when a branch line is branched from the trunk line of a wire harness in a corrugated tube.

2. Description of Related Art

A wire harness is protected by inserting the wire harness W/H through the inside of a corrugated tube 1 made of a hard resin, as shown in FIG. 3. The corrugated tube 1 may be used in an area where the wire harness needs protection from any externally interfering material such as may be present in an automobile.

The corrugated tube 1 is provided with ridge portions 1a and trough portions 1b, alternating in an axial direction of the tube 1, and one slit 1c is provided over the full length of the tube 1 in the axial direction for protecting the wire harness W/H by covering the side of the wire harness W/H.

Edges are formed at the end portions 10d and 10e of both sides of the corrugated tube 1 with the slit 1c there between. Since the corrugated tube is formed of a hard resin, damage may occur to the electric wires in the event the electric wires are scratched or pinched by the sharp edges of the end portions 10d, 10e.

Accordingly, when the trunk line of the wire harness W/H is inserted into the corrugated tube 1 and the branch line is branched from the trunk line, the branch line W2 cannot be pulled out of the corrugated tube 1 through the gap of the slit 1c without damage.

To avoid damage to the wires, devices having a structure as shown in FIG. 4 to FIG. 6 have been conventionally provided in order to pull out a branch line from a trunk line of a wire harness in a corrugated tube.

FIG. 4 shows a structure that is generally known and used in practice. In this known structure, the corrugated tube is cut at a position where the branch line is branched, the opposing edges of the corrugated tubes 1A and 1B are positioned on either side of the branched position so that the corrugated tubes do not cover the branched position, and the group of electric wires of the trunk line W1 and the branch line W2 at the branched position which are not covered by the corrugated tube are wound with an adhesive vinyl sheet S and thus protected.

FIG. 5 shows a prior art structure disclosed in JP-A-2000-166054. In this device a corrugated tube 1 is not cut at the branched position, and holes 1d substantially centered around the slit 1c are formed at the branched position by melting the tube 1. Separate ring members 3 are fitted into the inner periphery of the holes 1d, and the branch lines W2 are pulled outside of the tube 1 and inserted through the ring members 3.

FIG. 6 shows a prior art structure disclosed by the present inventor in JP-A-10-84611. In this device, a branch portion protective member 4 is provided on a corrugated tube at the branch position. The substantially T-shaped branch portion protective member 4 is provided at a position at which the branch line is branched from the trunk line of a wire harness. The upper and lower shaped members 4a and 4b have a sectional arc shape and are connected by a hinge 4c, and the upper and lower shaped members 4a and 4b are designed to cover the branched position of the trunk line and the branch line from both sides.

However, since the protection of the branched portion is only a winding by a sheet in the structure shown in the device of FIG. 4, there is the problem that the protection is not adequate at a portion at which a sharp external member may interfere with the wire harness.

Further, in the prior art it is required to divide the corrugated tube, at the branch position when in fact it is desired to provide continuous protection to the trunk line. Further, there is required the additional work of inserting the respective trunk lines in the divided corrugated tube. Further, it is required to wind a tape around the wires in order to completely cover the electric wire group by a tape winding at the branched position and the like, and the tape winding is an inconvenient step.

Further, when it comes to the structure as shown in FIG. 5, the corrugated tube is continuous to protect the trunk line, but the process of making a hole 1d increases the steps required and hole making jigs are required. Furthermore, the separate ring members 3 must be inserted in the inner peripheral surface of the holes, thereby increasing costs and inconvenience.

In addition, when the branch portion protective member 4 as shown in FIG. 6 is used, the protective corrugated tube in the trunk line must be divided into two at the branched position and must be connected to both ends of the branch portion protective member 4, leading to inconvenience. Further, the branch portion protective member 4 having a specific shape is required, and furthermore, many kinds of materials must be prepared in accordance with the difference in diameter of corrugate tubes, which will inevitably make the costs higher.

SUMMARY OF THE INVENTION

Considering the above mentioned and other problems, the present invention is provided. It is an object of the present invention to provide a device such that a branch line branched from a trunk line of a wire harness in a corrugated tube may be pulled out from the corrugated tube without dividing the corrugated tube and without any separate members required.

In order to solve the above mentioned and other problems, the present invention provides a corrugated tube structure for protecting a wire harness, wherein the trunk line of the wire harness is inserted into the corrugated tube made of a hard resin in which ridge portions and trough portions are alternately provided along an axial direction and a slit is provided along the full length of the tube in the axial direction, side portions positioned on opposing sides of the slit are bent or folded in the outward direction, so that a hole is formed to position the slit there between at the portion where a branch line will be branched from the trunk line, and the branch line extends from the hole toward the outside.

In the prior art, both of the opposing side portions of the slit could become a problem when the branch line branched from the trunk line of the wire harness inserted into the corrugated tube is pulled outside the corrugated tube through the portion of the slit.

The cylindrical shape of the corrugated tube having a cross-sectional circular shape generates spring stress when the slit is widened. The spring stress resisting the widening force is generated outward to the slit edges, and the slit edges may cause damage to electric wires inserted into the slit in the prior art. Accordingly, when the spring stress generated in the slit edges is eliminated, the force imposed on the slit edges is decreased, and the electric wires are not damaged even if the edges are brought into contact with the electric wires.

Based on the above observations, the present invention provides a corrugated tube deformed from a cross sectional circular shape by bending both portions of the slit outwardly at the position at which the branch will be pulled out from the corrugated tube, and the spring stress of the slit edges generated due to the circular shape is decreased.

Specifically, an outwardly bent portion forms the hole and makes semi-circular folds on both the upper and lower sides with the slit there between and with the slit forming a diameter on a horizontal axis and is bent in an orthogonal direction using the folds as the origin. Substantially semi-circular shape rings extend from both the upper and lower sides of the slit, and a cylindrical portion surrounding the branch line is formed by these upper and lower flanges. The cylindrical portion bent outwardly for forming the hole extends in the same direction as the branch line.

Accordingly, the edge portions of the slit become the edge of the cylindrical portion that is parallel to the branch line but do not become the edges thereof. Further, even if the electric wires are contacted because of vibration in an automobile body, the spring stress that is generated at the edges by bending is decreased. Therefore, the electric wires of the branch line are not damaged.

Further, the outwardly bent portion may be bent to a shape that extends outwardly in a direction orthogonal to the branch line direction, and further, may be bent 180° toward the outer peripheral face of the corrugated tube. Therefore, the edges of the outwardly bent portion are not brought into contact with the electric wires of the branch line. Furthermore, since the corrugated tube maybe molded of a suitable hard resin such as for example a polypropylene, a nylon or the like, the cylindrical portion formed by bending to form the hole for pulling out the branch line is retained in a bent condition, and will not contact the branch line if bent.

In addition, since a worker can easily bend such a corrugated tube by hand, no jig is required.

According to an aspect of the present invention a device for protecting a wire harness in a corrugated tube is provided, the corrugated tube formed of a hard resin and including ridge portions and trough portions alternating in the axial direction of the corrugated tube and a slit provided in the axial direction along the length of the corrugated tube, the protecting device including a pair of side portions provided on opposite sides of the slit, each side portion extending outwardly from the corrugated tube so that a hole is formed around the slit, the hole being provided on a portion of the corrugated tube where a branch line is branched from a trunk line of the wire harness to allow the branch line to extend through the hole. The protecting device may further include a pair of substantially semicircular folds on opposite sides of the slit forming a circle so that the slit forms a diameter of the circle, the pair of substantially semicircular folds being bent outwardly in a direction substantially orthogonal to the surface of the corrugated tube and forming a pair of substantially semicircular shaped flanges extending on opposite sides of the slit, the pair of substantially semicircular shaped flanges forming a substantially cylindrically shaped portion surrounding the branch line between the pair of flanges. Further, each side portion may be formed by bending outwardly a portion of the corrugated tube adjacent the slit.

BRIEF DESCRIPTION OF THE DRAWINGS

The above, and other objects, features and advantages of the present invention will be made apparent from the following description of the preferred embodiments, given as nonlimiting examples, with reference to the accompanying drawings in which.

DETAILED DESCRIPTION OF THE INVENTION

The particulars shows herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

The present invention is described below with reference to the drawings. An embodiment of the invention is illustrated in FIGS. 1 and 2.

Figure 1A:
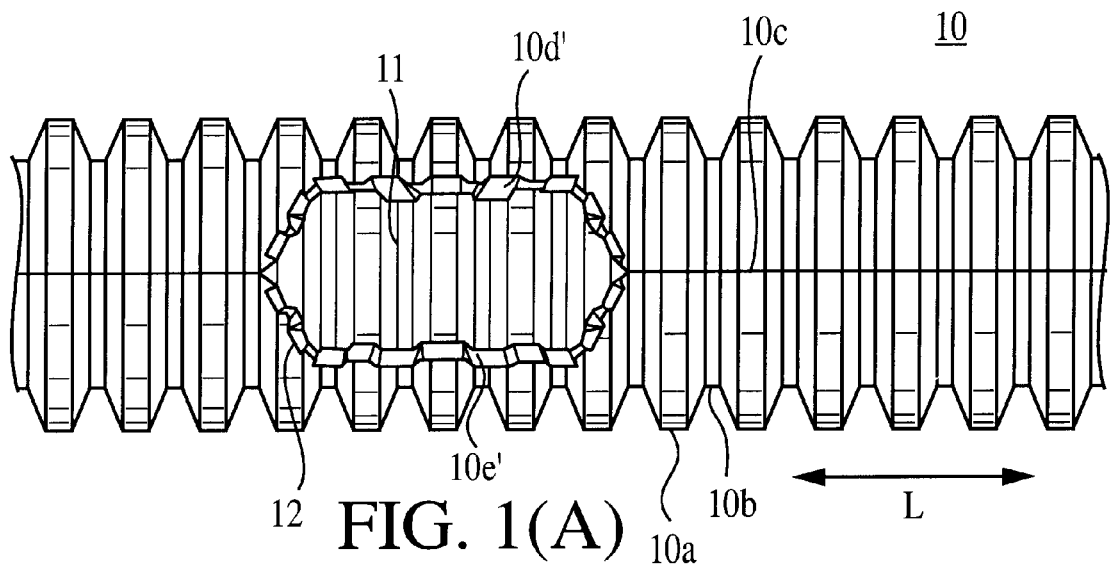
FIG. 1A is a front view showing a corrugated tube according to the present invention.
Figure 1B:
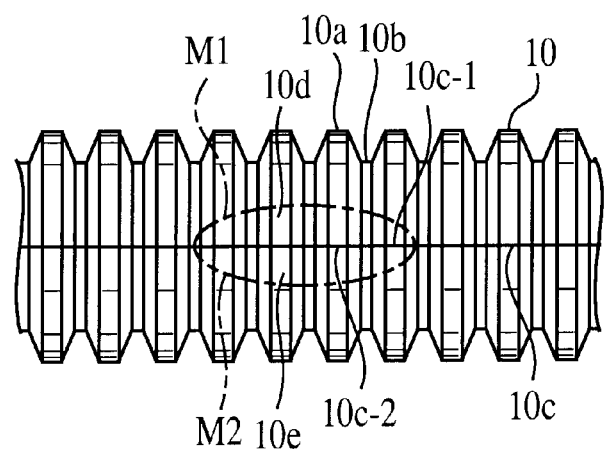
FIG. 1B is a front view of the corrugated tube of FIG. 1A before making a hole.
Figure 2:
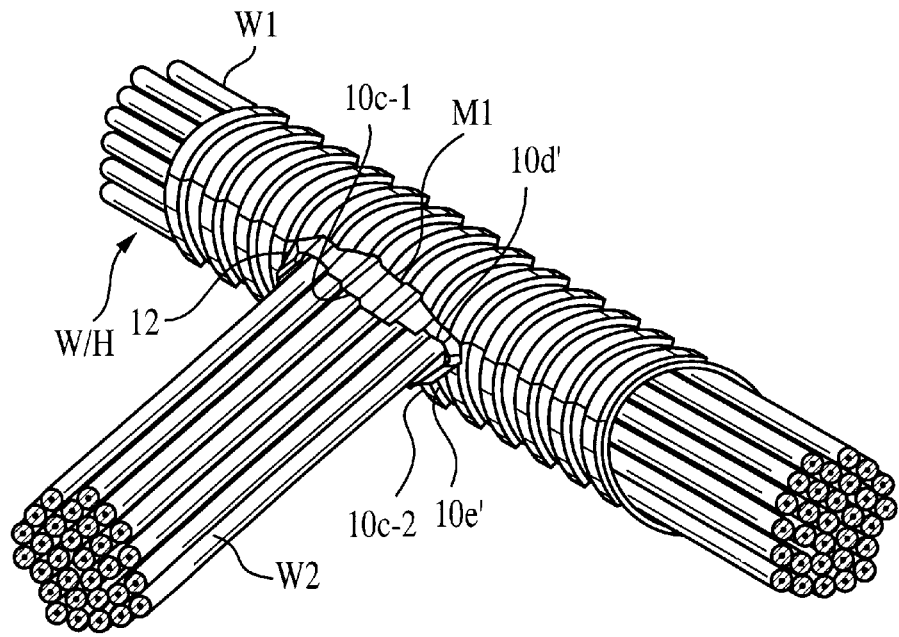
FIG. 2 is a perspective view of the corrugated tube of FIG. 1 showing a wire harness into the corrugate tube.
Figure 3:
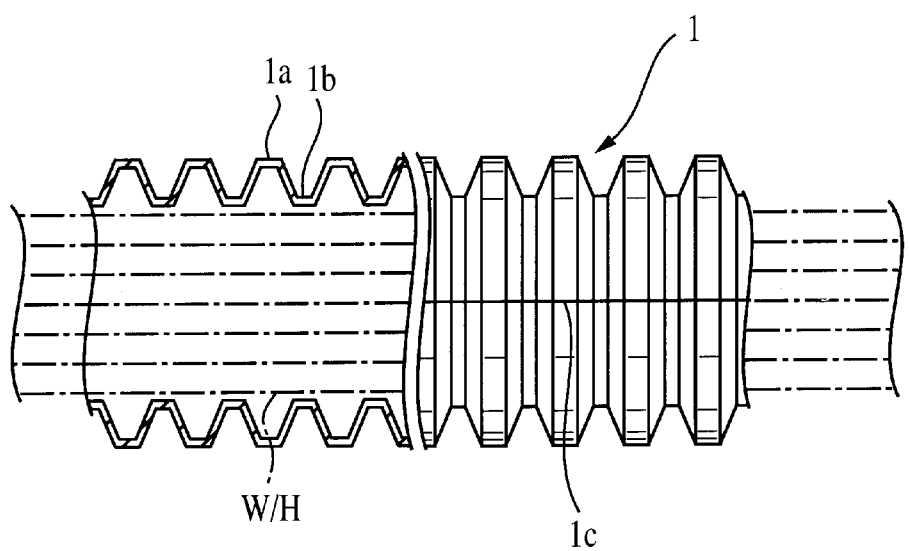
FIG. 3 is a partially sectional view of a conventional corrugated tube.
Figure 4:
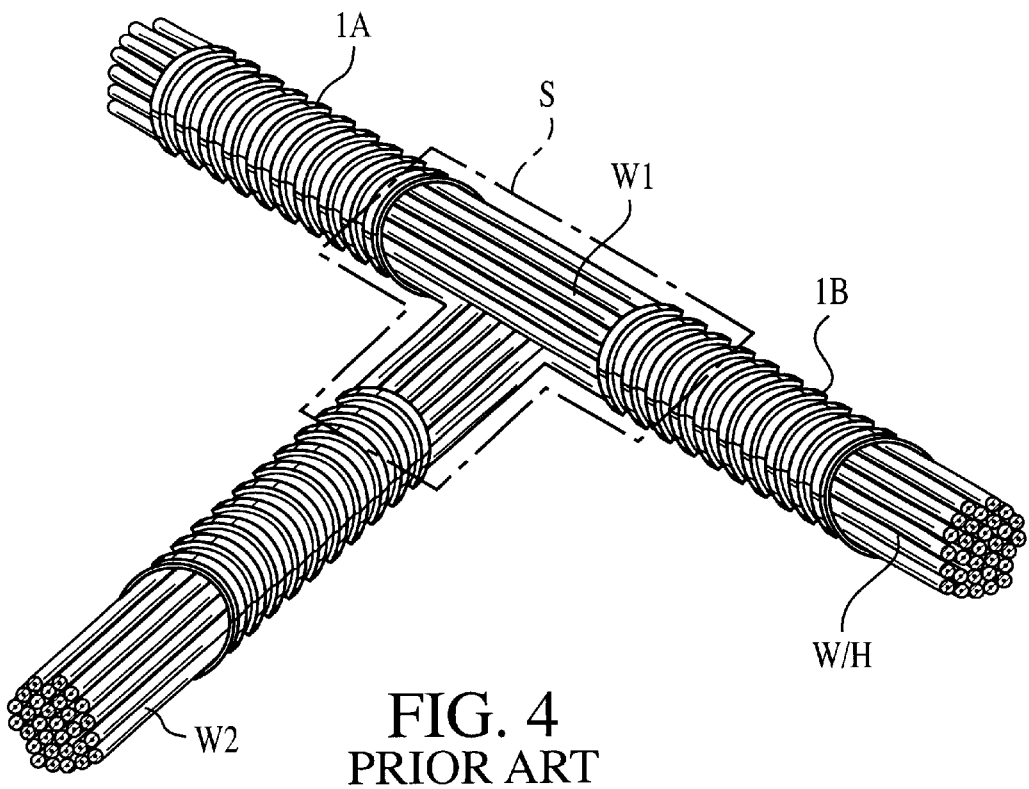
FIG. 4 is a perspective view showing a conventional example.
Figure 5:
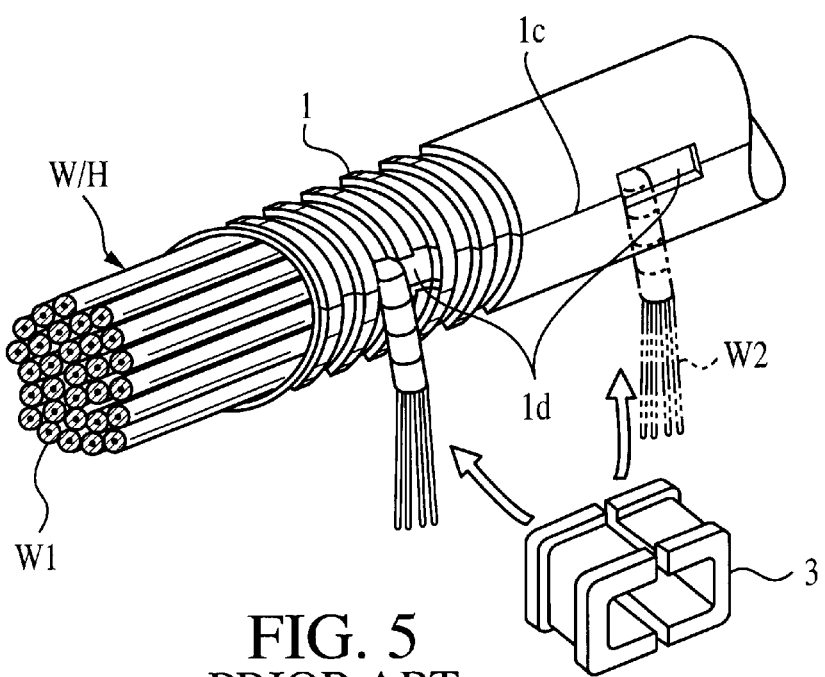
FIG. 5 is a perspective view showing another conventional example.
Figure 6:
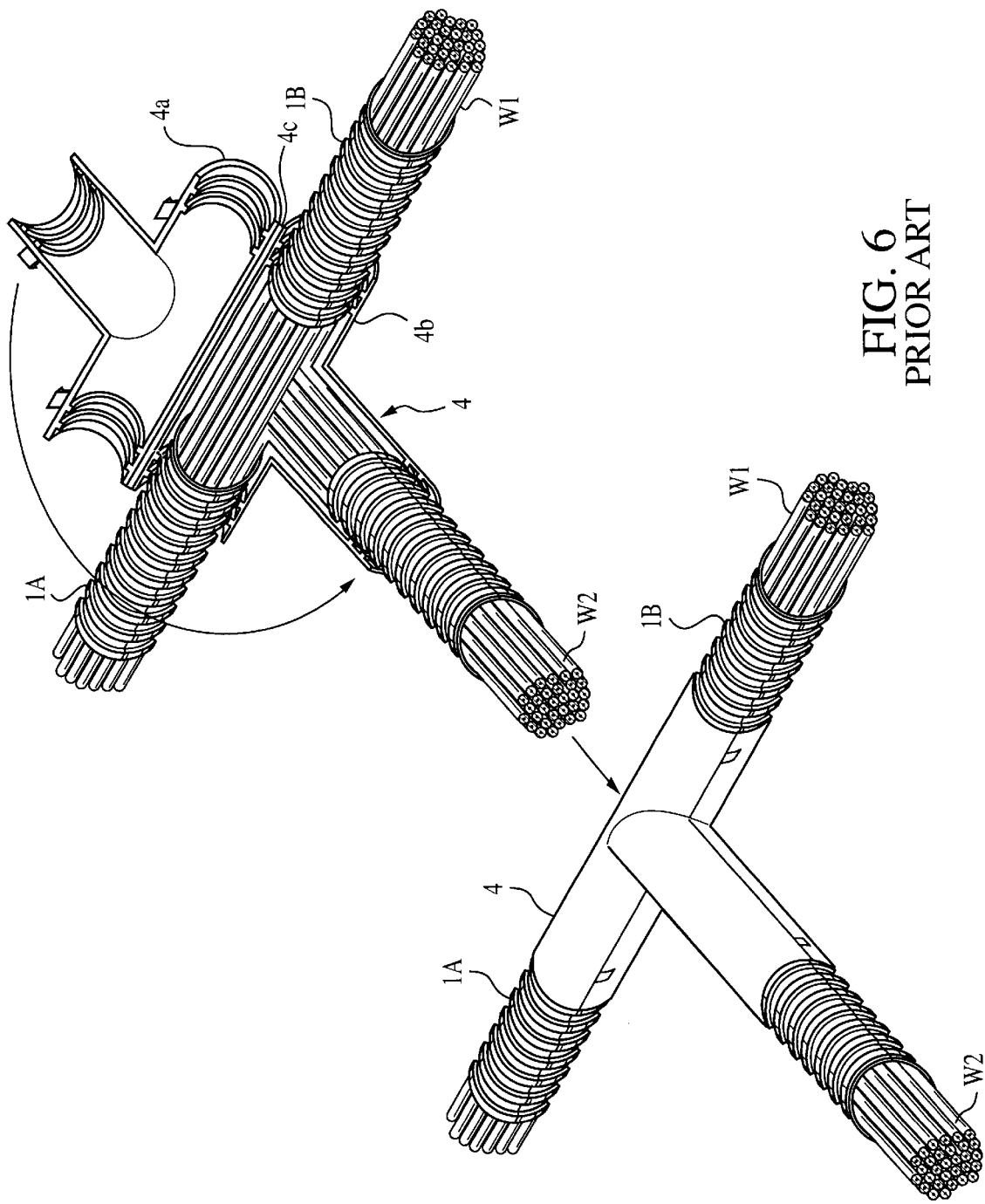
FIG. 6 is a perspective view showing another conventional example.

FIG. 1A shows a hole 11 for pulling out a branch line provided on the corrugated tube 10. FIG. 2 shows a trunk line W1 of the wire harness W/H inserted into the corrugated tube 10, with the branch line W2 pulled out from the hole 11.

The corrugated tube 10 is formed, such as, for example, by molding a hard resin in a conventional manner known to those of skill in the art. The corrugated tube 10 is provided with ridge portions 10a and trough portions 10b alternating in an axial direction L of the corrugated tube 10. One slit 10c is provided along the full length of the corrugated tube 10 in the axial direction thereof.

At the position at which the branch line W2 will be branched off from the trunk line W1 of the wire harness W/H in the corrugated tube 10, semi-circular shaped folds M1 and M2 are formed at both the upper and lower side portions 10d and 10e. The semicircular folds M1 and M2 are positioned on opposite sides of the slit 10c with the slit there between and substantially forming a circular or oval shape with the slit as a diameter. The semicircular folds M1 and M2 are bent in an orthogonal direction so that near semi-circular shaped flanges 10d' and 10e' extend from both the upper and lower sides of the slit 10c. The substantially cylindrical portion 12 surrounding the substantially circular shape hole 11 is formed by the upper and lower flanges 10d' and 10e'.

With the structure of the above mentioned substantially cylindrical portion 12, a worker can carry out the work of bending or folding the side portions 10d and 10e of the slit 10c by hand. Further, the size of the cylindrical portion 12 can be formed in any size, such as a size corresponding to the diameter of the branch line W2 inserted through the cylindrical portion 12, by marking the tube 1 at the position of the semi-circular folds M1 and M2 in accordance with the diameter of the branch line W2.

Furthermore, since the corrugated tube 10 is made of a hard resin, once the cylindrical portion 12 is formed by bending or folding, the shape is retained and will not be further deformed by bending.

As described above, the branch line W2 may be pulled out of the corrugated tube 10 having the trunk line W1 therein at the position in which the branch line W2 is branched, from the hole 11 provided at the branched position of the corrugated tube 1. The corrugated tubes remains continuous without division or cutting.

Further, the edge of the cylindrical portion 12 surrounding the hole 11 is positioned at the bent corners of the side edges 10c-1 and 10c-2 of the slit 10c, and the edges 10c-1 and 10c-2 are parallel to the branch line W2 at the perimeter of the hole 11. Therefore, the edges 10c-1 and 10c-2 do not contact or pinch the wire harness W/H. Further, there is no problem of damage occurring to the electric wires by a conventional slit edge.

Further, even if the cylindrical portion 12 is deformed or brought in contact with the branch line W2 by vibration of an automobile body, the cylindrical portion 12 is not brought into contact with the branch line W2 from an orthogonal direction. Further, since the spring stress generated at the slit edge is reduced, the electric wires are not damaged.

As is clear from the description above, according to the present invention, the corrugated tube into which the trunk line of a wire harness is inserted does not require dividing at the branched position of a branch line and can be continuous. Accordingly, decrease in protective function at the branched position that has been generated at dividing the tube as in the prior art can be eliminated. Therefore, reliability and product quality can be remarkably improved.

Further, the conventional products available on the market can be used as a corrugated tube, and it has such various advantages that a worker can pull a branch portion of a wire harness out of the hole on the corrugated tube by hand and without applying jigs, the invention can be easily utilized without changing a conventional production line and introducing a specific facility.

Although the invention has been described with reference to an exemplary embodiment, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

The present disclosure relates to subject matter contained in priority Japanese Application No. 2001-159983, filed on May 29, 2001, which is herein expressly incorporated by reference in its entirety.

What is claimed is:

1. A device for protecting a wire harness in a corrugated tube, the corrugated tube formed of a hard resin and including ridge portions and trough portions alternating in the axial direction of the corrugated tube and a slit provided in the axial direction along the length of the corrugated tube, said protecting device comprising;
a pair of side portions formed unitarily with said corrugated tube provided on opposite sides of the slit, each said side portion extending outwardly from the corrugated tube so that a hole is formed around the slit, said hole being provided on a portion of the corrugated tube where a branch line is branched from a trunk line of the wire harness to allow the branch line to extend through said hole.

2. The device for protecting a wire harness in a corrugated tube according to claim 1, said protecting device further comprising a pair of substantially semicircular folds on opposite sides of the slit forming a circle so that the slit forms a diameter of the circle, said pair of substantially semicircular folds being bent outwardly in a direction substantially orthogonal to the surface of the corrugated tube and forming a pair of substantially semicircular shaped flanges extending on opposite sides of the slit, said pair of substantially semicircular shaped flanges forming a substantially cylindrically shaped portion surrounding the branch line between said pair of flanges.

3. The device for protecting a wire harness in a corrugated tube according to claim 2, wherein edges of said pair of substantially semicircular shaped flanges are bent so as to be out of contact with electric wires of the branch line of the wire harness.

4. The device for protecting a wire harness in a corrugated tube according to claim 1, wherein each said side portion is formed by bending outwardly a portion of the corrugated tube adjacent the slit.

5. The device for protecting a wire harness in a corrugated tube according to claim 4, wherein edges of said pair of side portions are bent so as to be out of contact with electric wires of the branch line of the wire harness.

6. The device for protecting a wire harness in a corrugated tube according to claim 1, wherein edges of said pair of side portions are positioned so as to be out of contact with electric wires of the branch line of the wire harness.

7. A device for protecting a wire harness in a corrugated tube, the corrugated tube formed of a hard resin and including ridge portions and trough portions alternating in the axial direction of the corrugated tube and a slit provided in the axial direction along the length of the corrugated tube, said protecting device comprising;
a pair of side portions provided on opposite sides of the slit, each said side portion extending outwardly from the corrugated tube so that a hole is formed around the slit, said hole being provided on a portion of the corrugated tube where a branch line is branched from a trunk line of the wire harness to allow the branch line to extend through said hole;
said protecting device further comprising a pair of substantially semicircular folds in the corrugated tube along the edges of the slit and on opposite sides of the slit forming a circle so that the slit forms a diameter of the circle, said pair of substantially semicircular folds being bent outwardly in a direction substantially orthogonal to the surface of the corrugated tube and forming a pair of substantially semicircular shaped flanges extending on opposite sides of the slit, said pair of substantially semicircular shaped flanges forming a substantially cylindrically shaped portion surrounding the branch line between said pair of flanges.

8. A device for protecting a wire harness in a corrugated tube, the corrugated tube formed of a hard resin and including ridge portions and trough portions alternating in the axial direction of the corrugated tube and a slit provided in the axial direction along the length of the corrugated tube, said protecting device comprising;
a pair of side portions provided on opposite sides of the slit, each said side portion extending outwardly from the corrugated tube so that a hole is formed around the slit, said hole being provided on a portion of the corrugated tube where a branch line is branched from a trunk line of the wire harness to allow the branch line to extend through said hole;
wherein each said side portion is formed by bending outwardly a portion of the corrugated tube adjacent the slit.

* * * * *

UNITED STATES PATENT AND TRADEMARK OFFICE
CERTIFICATE OF CORRECTION

PATENT NO.     : 6,603,074 B2
DATED          : August 5, 2003
INVENTOR(S)    : H. Seo It is certified that error appears in the above-identified patent and that said Letters Patent is hereby corrected as shown below:

<u>Title page,</u>
Item [56], Reference Cited, FOREIGN PATENT DOCUMENTS,
"10-846111" should be -- 10-84611 --.

Signed and Sealed this

First Day of June, 2004

JON W. DUDAS
*Acting Director of the United States Patent and Trademark Office*